May 28, 1940.  F. KOCH  2,202,210
AUTOMATIC MILLING MACHINE
Filed Sept. 22, 1937  8 Sheets-Sheet 1
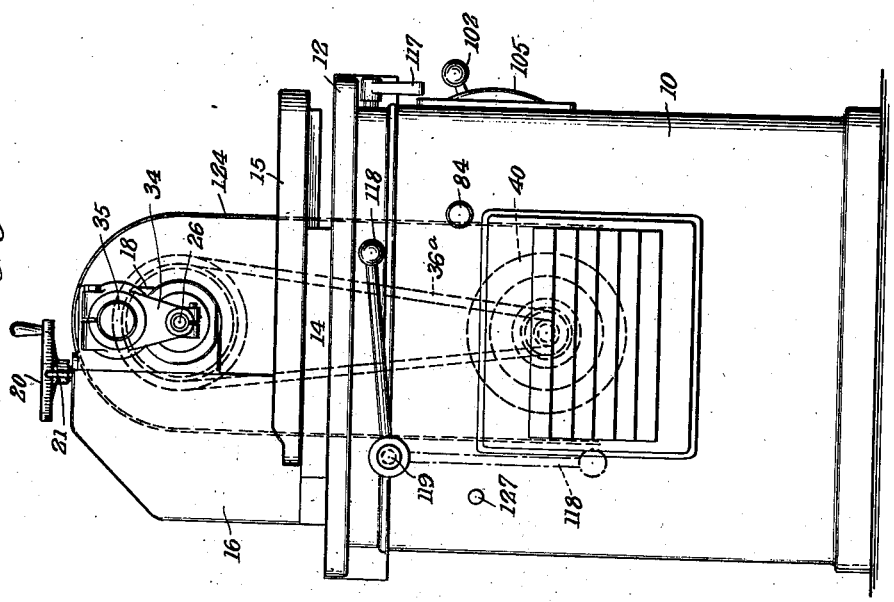
FREDERICK KOCH
INVENTOR
BY
ATTORNEY May 28, 1940.　　　　F. KOCH　　　　2,202,210
AUTOMATIC MILLING MACHINE
Filed Sept. 22, 1937　　8 Sheets-Sheet 2
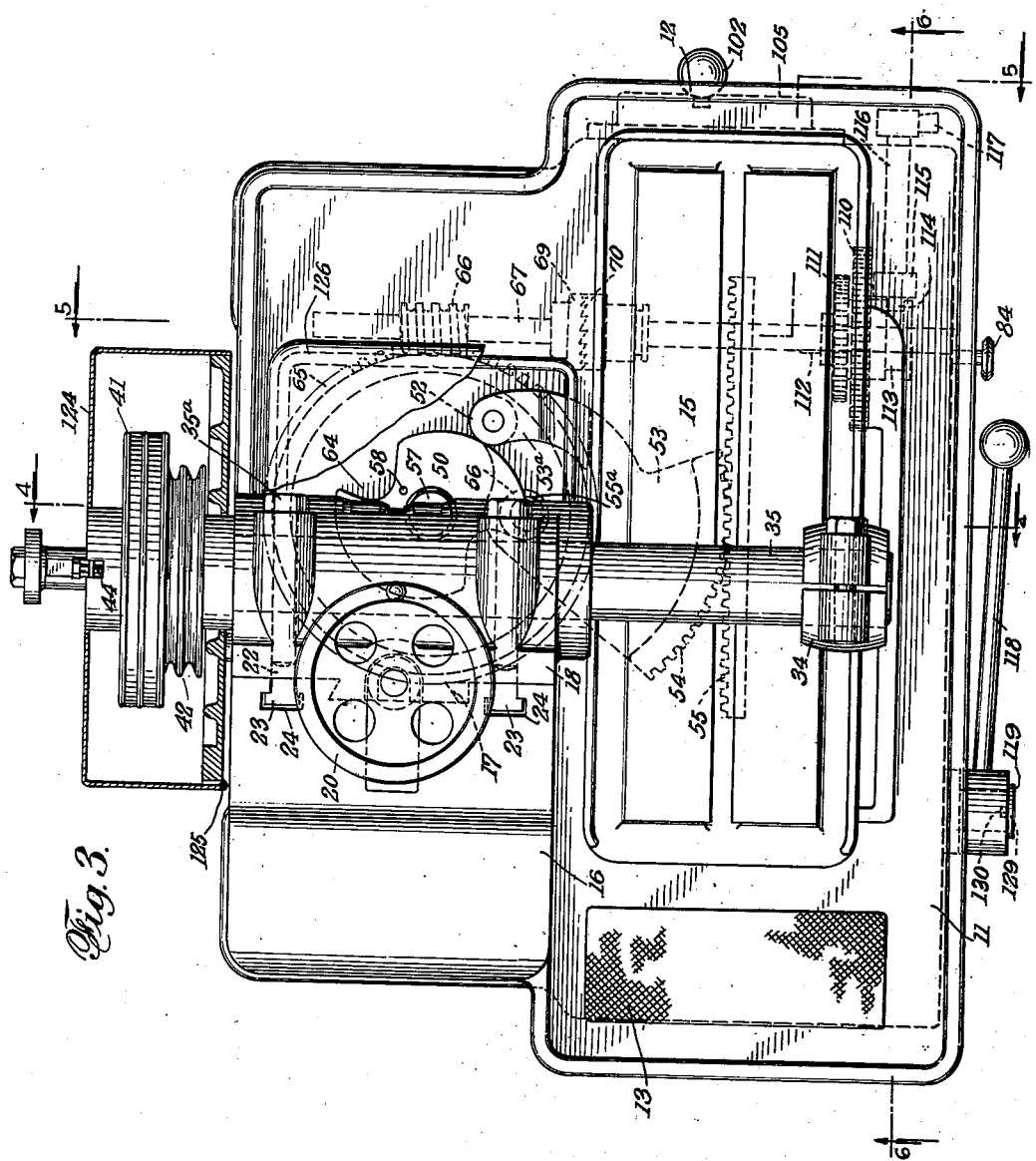
FREDERICK KOCH
INVENTOR
BY
ATTORNEY May 28, 1940.　　　　　F. KOCH　　　　　2,202,210
AUTOMATIC MILLING MACHINE
Filed Sept. 22, 1937　　　8 Sheets-Sheet 3
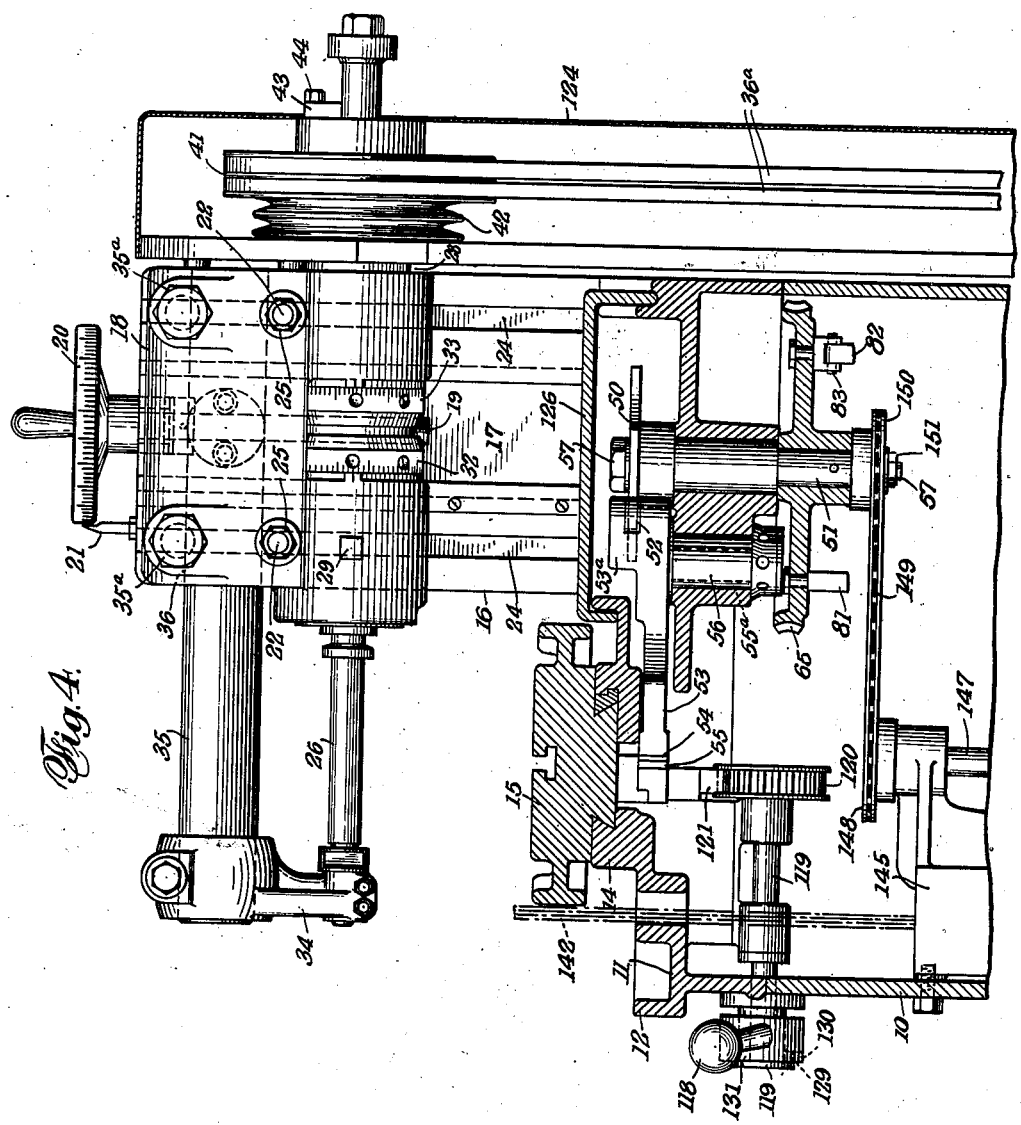
Fig. 4.
FREDERICK KOCH
INVENTOR
BY 
ATTORNEY

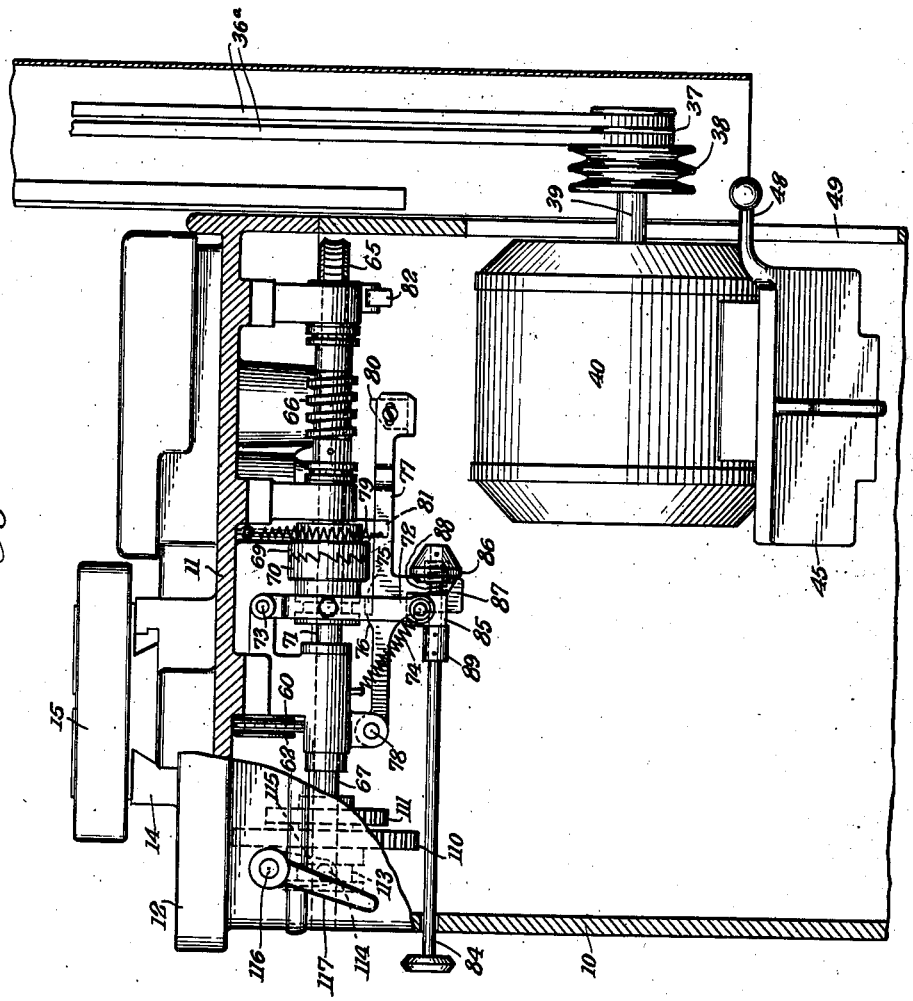

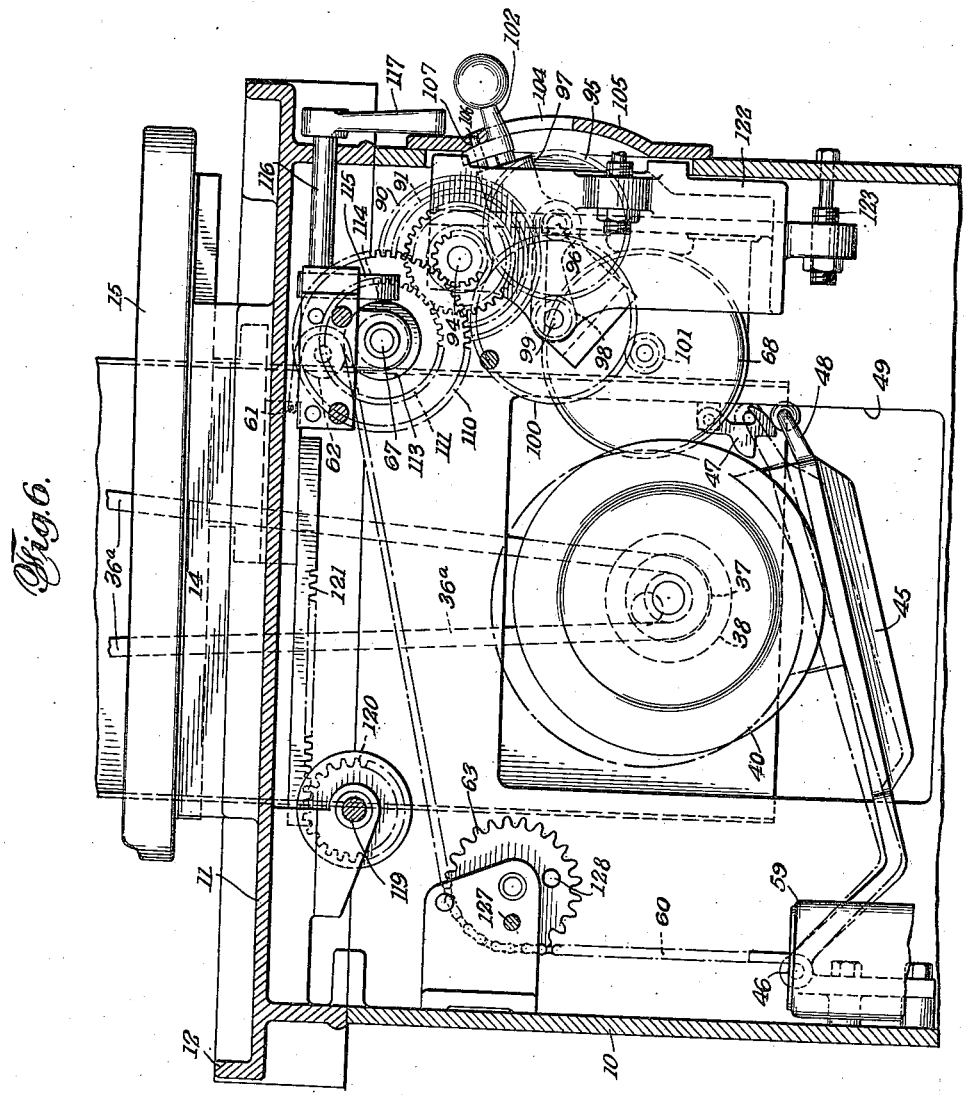

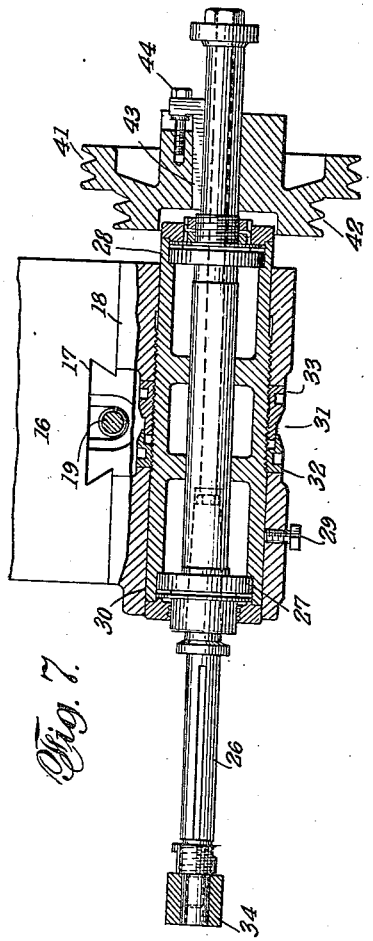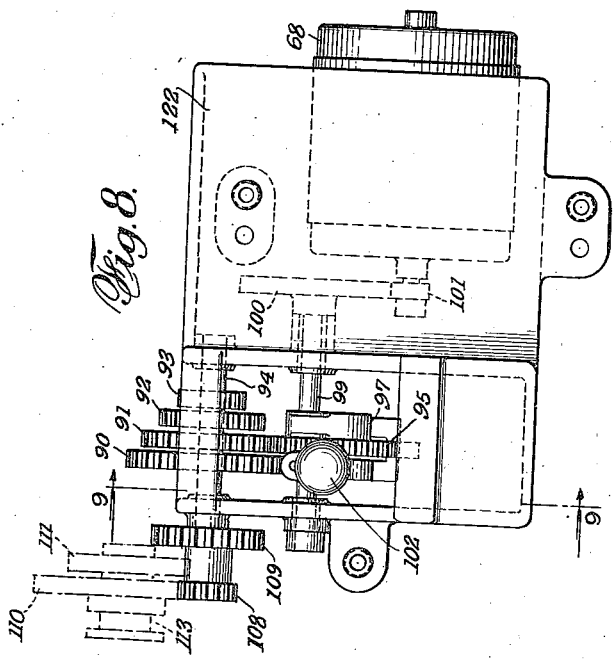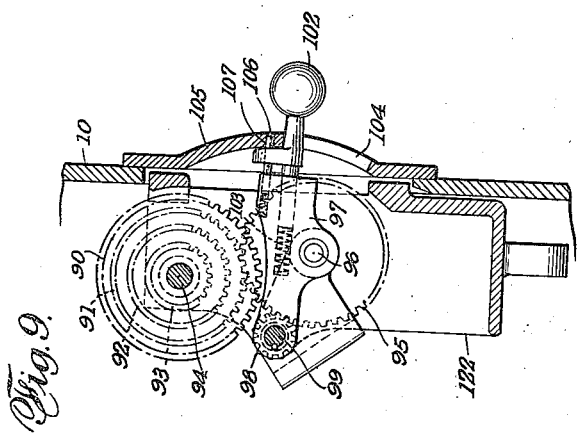

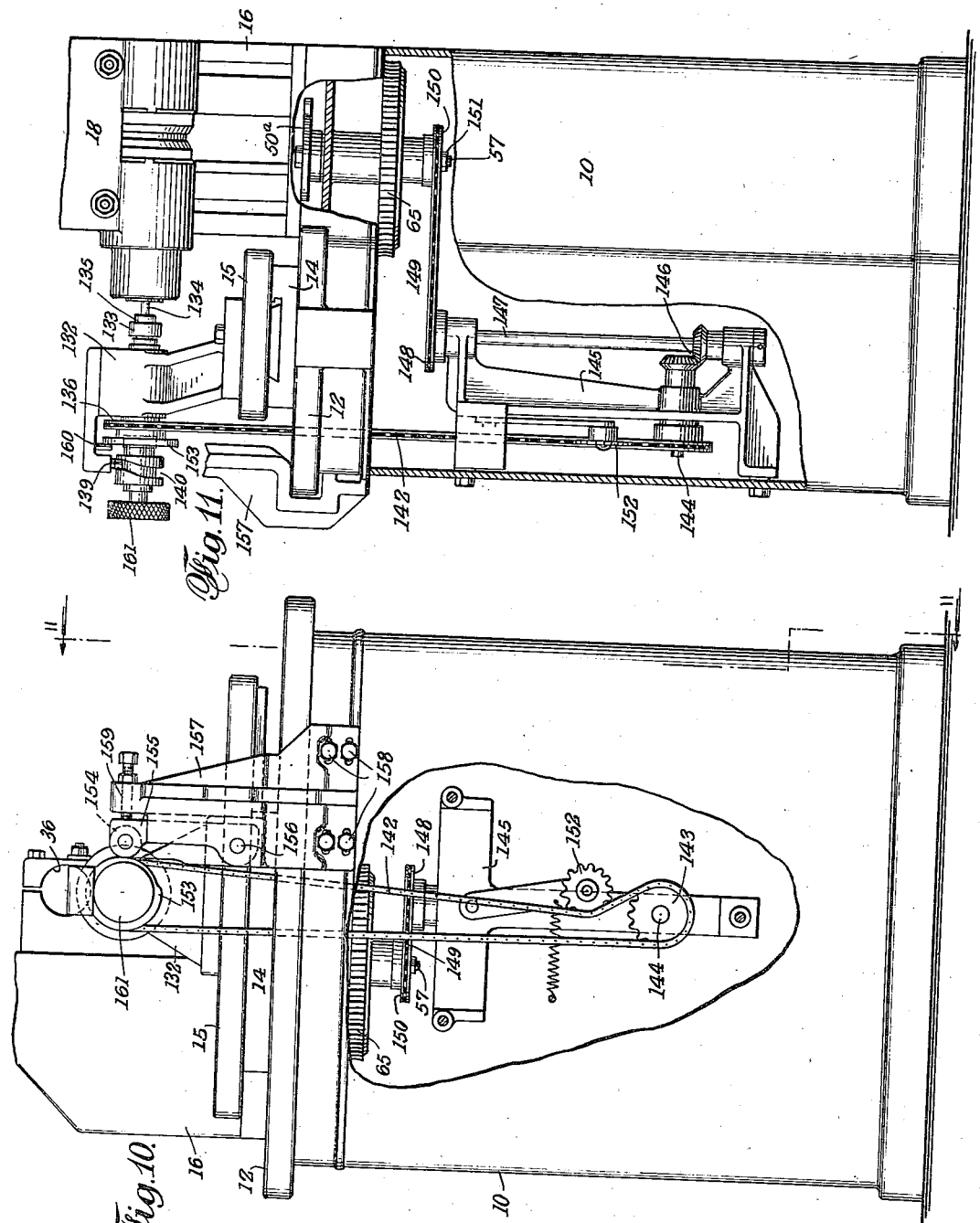

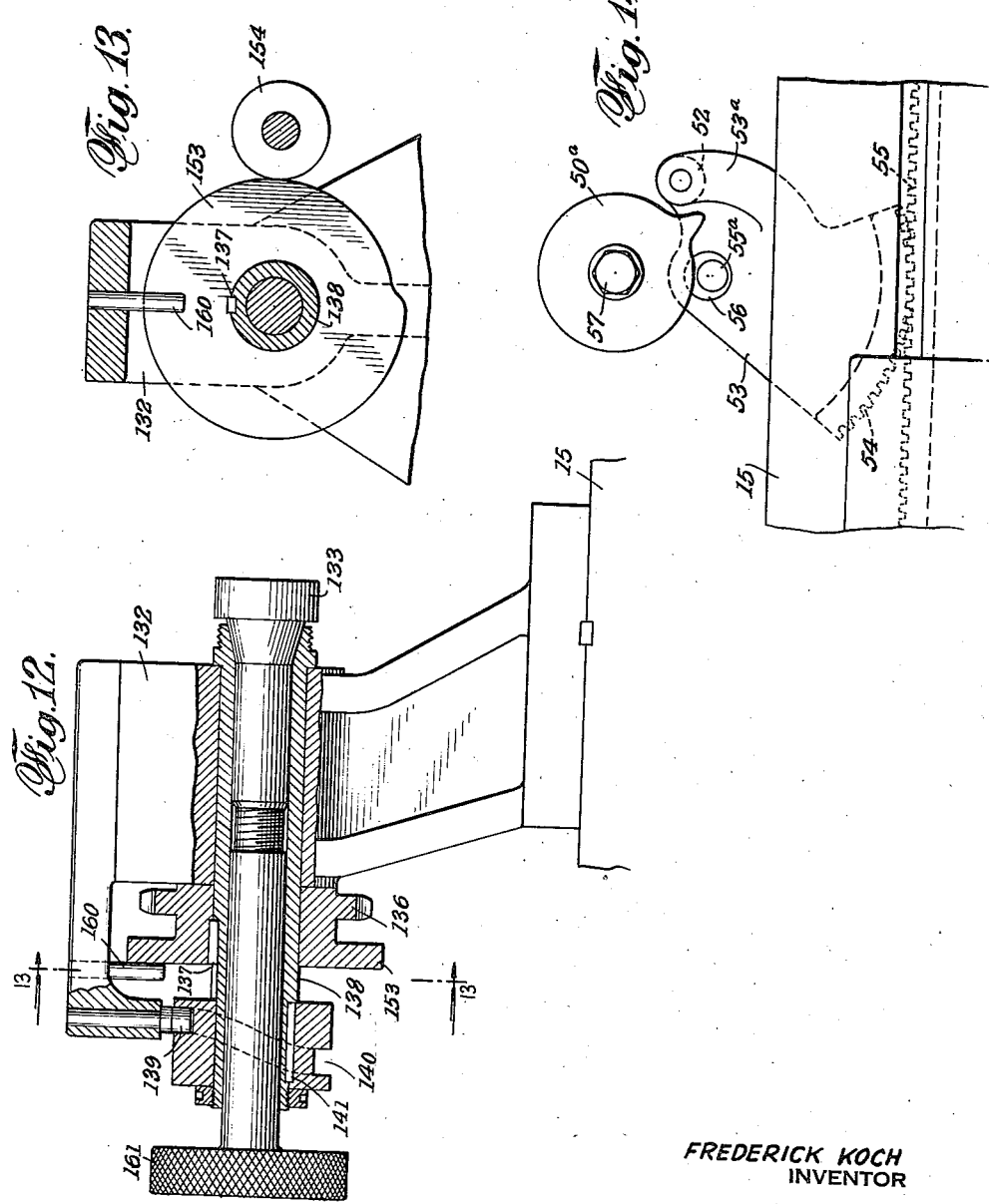

Patented May 28, 1940

2,202,210

UNITED STATES PATENT OFFICE 2,202,210

AUTOMATIC MILLING MACHINE

Frederick Koch, Sparta, N. J., assignor to Associated Patentees, Inc., Ampere, N. J., a corporation of New Jersey Application September 22, 1937, Serial No. 165,033

16 Claims. (Cl. 90—21)

The invention herein disclosed relates to milling machines.

Special objects of the invention are to provide a machine of this character, which will be entirely automatic in its operation; which can be readily set and adjusted to make different kinds of cuts; which will be accurate and reliable in operation and which will be of sturdy and relatively simple design and construction.

The foregoing and other objects are attained in this invention by the novel features of construction, combinations and relations of parts hereinafter described, illustrated in the accompanying drawings and broadly covered in the claims.

The drawings illustrate one of the practical commercial embodiments of the machine, but the structure may be changed and modified as regards this disclosure all within the true intent and broad scope of the claims.

Fig. 1 is a front elevation of one of the machines.

Fig. 2 is an end view of the same, with the belt cover shown in section.

Fig. 3 is a broken part sectional plan view of the machine.

Fig. 4 is a broken vertical sectional view as on substantially the plane of line 4—4 of Fig. 3.

Figs. 5 and 6 are broken and part sectional views substantially on the lines 5—5, 6—6 of Fig. 3.

Fig. 7 is a broken sectional detail of the spindle mounting.

Fig. 8 is a view of the carriage drive motor and gearing unit detached from the base of the machine.

Fig. 9 is a broken sectional view substantially as on line 9—9 of Fig. 8 of the carriage feed motor and gear unit as in position in the machine.

Fig. 10 is a front view similar to Fig. 1 with parts broken away to show the special feed mechanism for work which needs to be turned in respect to the cutter.

Fig. 11 is a broken vertical sectional view as on line 11—11 of Fig. 10.

Fig. 12 is an enlarged broken sectional detail of the special in and out feed cam mechanism for the work holder.

Fig. 13 is a broken sectional detail as on line 13—13 of Fig. 12.

Fig. 14 is a broken plan of the special one lobe cam used for the rotary fixture.

In the machine illustrated, a hollow upstanding base 10, of substantial proportions provides a support for all the parts and a housing for the motive power, gearing and drive connections. This base has a table top 11, provided with a surrounding rim 12, to collect the cutting oil and which as indicated at 13, Fig. 3, may be drained off, filtered and recirculated.

On the top or table portion of the base there is provided the guide 14, for the work carriage 15, and rising from the table at one side of said work carriage is the pedestal 16, provided with vertical guide 17, for the spindle carrying head 18. This head is shown as adjustable vertically by screw 19, provided with hand wheel 20, scaled to register with an index pointer 21. To lock the spindle head in vertically adjusted position, bolts 22 are shown in Figs. 3 and 4 having T-heads 23, riding in T-slots 24, in the pedestal, said bolts carrying the clamp nuts 25, at their outer ends.

The cutter spindle is designated 26, and is shown in Fig. 7 as journalled in frictionless bearings, such as taper roll bearings 27, spaced in the opposite ends of a bearing sleeve 28, adjustably secured by set screws 29, in a bore 30, in the spindle head. This bore is opened up at the center as indicated at 31, to receive the overlapping thrust rings 32, 33, screwed over the bearing sleeve and adapted when turned to exert thrust in one direction or the other to shift the bearing sleeve longitudinally in its bore or seat 30.

An outboard bearing for the cutter spindle is shown provided by an arm 34, dependent from an overstanding bar 35, secured by bolts 35a, in the socket 36, provided therefor in the spindle head.

The drive of the spindle head is shown as provided by twin V-shaped belts 36a, from twin pulleys 37, 38, on shaft 39, of motor 40, to companion twin pulleys 41, or 42, on the outer end of the spindle. The motor pulleys and spindle pulleys are shown as of different sizes to provide different desired spindle speeds with the same motor operation. These may be double pulleys adjustably secured as shown in Fig. 7 by wedge keys or gibs 43, which can be shifted in opposite directions and locked in the desired adjustments by screws such as indicated at 44.

To provide desired tension on the belts and to enable vertical adjustments of the spindle head without affecting the belt drive, the motor is shown as hung on the belts by being mounted on a support 45, pivoted at one end at one side of the base at 46, Fig. 6.

To facilitate changing of the belts from one speed ratio to another, the hinged motor support 45 is shown as adapted to be hooked up at its free end on a hook 47, Fig. 6, positioned to catch the lifting handle 48, when the latter is raised to the dotted line position. This handle is shown in Fig. 5 as projecting out through a doorway 49, in the side of the base and the hook 47, is hung to act as a gravity latch to automatically catch and hold this handle when lifted within the reach of the hook. When this occurs, the motor is supported entirely free of the belts which are then loosened up to be easily removed and shifted from one set of pulleys to the other. After this change is made, the handle may be lifted to take the weight off the hook which then can be thrown out of engagement with the handle and the handle lowered to again hang the weight of the motor in the bight of the belts. Vertical adjustments of the spindle head, through the belts, merely raise and lower the motor accordingly, without affecting the drive between these two.

The carriage is advanced to carry the work to the cutter on the spindle by cam 50, on the upper end of a vertical shaft 51, journalled in the table top and engaging the roll 52, on one arm of a cam lever 53, carrying a gear segment 54, in mesh with a rack 55, on the underside of the carriage. This cam lever is shown as carried by pivot stud 55a, journalled in an eccentric bushing 56, which can be shifted to bring the gear segment in proper mesh with the carriage rack.

The feed cam 50, is removably secured on the upper end of shaft 51, by bolt 57, and is keyed as by means of a pin or pins 58, so that it will go on the shaft only in the one position. This is shown as a relatively thin edge cam which can be accurately ground to give the desired feed movement and any number of such cams may be provided to suit the character of work to be performed on the machine. In the particular illustration, a double lobed cam is shown, but single or any multiple lobe cams may be used.

By the selection of a properly designed cam, practically any desired feed can be imparted to the work carriage, that is a relatively fast or slow, or at a constant or varying rate of movement and a quick return movement be effected. In the illustration, return of the carriage is accomplished by a weight at 59, hung from a sprocket chain 60, Fig. 6, attached at the upper end to the carriage at 61, and guided over rolls or sprockets 62, 63. This weight effects a smooth quick return of the carriage at a rate determined by the return side of the cam, which as indicated at 64, in Fig. 3, may be relatively abrupt.

The cam shaft 51 is shown as carrying a worm gear 65, at its lower end engaged by a worm 66, on the shaft 67. This shaft is indicated as driven by a set of change speed gears from a motor 68, Fig. 6.

To automatically stop the operations at the end of each carriage feed and retraction, a clutch is provided on the drive shaft 67, and this is tripped at the end of each complete cycle of operations.

In Figs. 3 and 5, the automatic clutch is shown as consisting of a clutch element 69, fixed on shaft 67 and engageable by a companion movable clutch element 70, slidably keyed on this shaft at 71, and engaged by a clutch shifting fork 72, pivoted at 73, and acted on by a clutch opening spring 74. The clutch shifting lever 72, is shown as latched in the clutch engaged position by a lug 75, engageable over a holding nose 76, on the clutch latch lever 77. This latter is shown as pivoted at one end at 78, releasably supported in the clutch latching position by a spring 79, and as carrying at its free end an inclined lug 80, positioned for engagement by a trip lug or lugs 81, 82, on the underface of worm gear 65.

As each lobe of the cam is designed to effect and control a complete feed and retractive movement of the work carriage, there will usually be provided one such trip pin for every lobe of the cam. In the present disclosure, with two lobes, there are two such trip pins and one of these, 82, is indicated as pivoted at 83, so that if not required, as when a single lobed cam is in use, it may be simply folded up out of the way, where it will not engage the cam piece 80, on the clutch latching and tripping lever.

After the clutch has been tripped and the operations stopped at the end of a complete cycle, the cut piece may be removed and a new blank be placed in the holder on the carriage. Operations may then be initiated by closing the clutch through the medium of a push rod 84, Fig. 5, extended out through the front of the base and having a sliding engagement at 85, in the lower end of clutch lever 72. This control rod is shown as carrying a reversely coned head 86, at its inner end engageable over a cam surface 87, on latch lever 77, to lower the same clear of the lug 75, on the clutch lever. A spring 88 is shown interposed between the back of this head and the sleeve portion 85, and a fixed collar is shown on the rod at 89, to limit the sliding movement of the rod in sleeve 85. This lost motion form of connection permits the control rod to be drawn out sufficiently to depress the latch lever to disengage the nose 76 from lug 75, so that spring 74, will then throw clutch lever 72, into the clutch open position. The fixed collar 89, enables an inward pushing movement of the rod, to force the lower end of the clutch lever in a clutch engaging direction and in this movement, the forwardly faced cone on the end of the control rod simply forces the clutch latching lever downwardly and then permits it to follow upwardly to bring the holding nose 76, in back of lug 75, on the clutch lever.

The change speed gear set for the carriage drive is shown particularly in Figs. 6, 8 and 9, as consisting of a set of four gears 90, 91, 92, 93, on shaft 94, selectively engageable by a gear 95, journalled at 96, in a lever 97, yoked about a pinion 98, slidably keyed on an intermediate shaft 99, carrying a gear 100, in mesh with a pinion 101, on the shaft of motor 68. The gear shifting yoke or lever 97 is shown as having a sliding handle 102, yieldingly projected by spring 103, out through gear shift slot 104, in an arcuate gear cover 105. This handle as shown in Fig. 9, may be locked in any one of the four gear positions by an outwardly projecting pin 106, adapted to enter a properly located seat 107, in the gear cover.

The shaft 94, carrying the four different speed gears also in the illustration carries two drive gears 108, 109, of different diameters adapted to mesh respectively with either of the two gears 110, 111, on the worm shaft 67. These two gears 110, 111, are indicated at 112, Fig. 3, as slidingly keyed on shaft 67, and as shiftable to mesh gears 108, 109, by an attached collar 113, engaged by pin 114, Fig. 6, on the lower end of an arm 115, carried by rock shaft 116, which projects through the side of the base and is equipped with an operating handle 117.

For shifting the carriage by hand, there is provided in the present disclosure, a lever 118, at the front of the machine on the outer end of a shaft 119, which carries at its inner end a pinion 120, in mesh with an additional rack 121, on the underside of the carriage below the normal or automatic feed rack 55.

To enable convenient setting up of the carriage feed motor and change speed gears, these may all be mounted on a sub-base 122, Figs. 8 and 9, which may be bolted as a unit to the inside of the base structure as indicated at 123, Fig. 6.

A guard is shown at 124, covering the entire belt drive and hinged at one side 125, Fig. 3, so that it may be swung open to provide access to the handle 48, for lifting the belt suspended motor 40, as for purposes of changing the belts or the like.

As shown particularly in Figs. 3 and 4, the feed cams such as 50, may overstand the cam lever to some extent, so as to bring the lever center and cam center close together. In such case, the cam roll 52, is journalled in a forked raised portion 53a, of the lever, to bring it into line with the edge of the cam.

When the machine is in operation, the cam and cam lever will normally be covered by a removable guard 126, Figs. 3 and 4, which can be quickly lifted off for changing cams or the like.

Various kinds of work holders may be used on the work carriage. By proper selection of the change speed gears and by use of a properly designed feed cam, the work may be advanced to the cutter at the speed for best results and at a regular or a varying rate, depending upon the character of the cut. As the cut is completed, the carriage will be quickly returned and stopped in the retracted position through operation of the clutch tripping lever 77, which is then released by the engagement of one of the trips 81, 82, on the bottom of the worm gear (Figs. 4 and 5). As soon as a new blank is inserted in the work holder, the active cycle may be started again by simply pushing in the hand control rod 84, which closes the clutch and places the clutch latching lever 77 again in position to be released by the trip on the worm gear. At any time, the operations may be instantly stopped by pulling out the hand control 84, to open the clutch.

The two selective final drive gears 110, 111, controlled by the swinging handle 117, Figs. 3 and 6, serve to double the possible speed changes, providing the effect of an eight speed gear box with only a four speed set of gears.

In setting the machine up, the hand lever 118, may be used to shift the carriage manually back and forth and hand feed of this sort may be resorted to at any time when the clutch is in the disengaged relation.

The hanging of the spindle driving motor in the loop of the drive belts keeps these belts under desired tension and at the same time, provides a drive connection which permits of vertical adjustments of the spindle head without changing the driving relation between the motor and spindle.

To free the carriage of the return weight 59, provision is made for supporting the latter in elevated position, the same consisting in the illustration of a pin 127, Figs. 1 and 6, which can be pushed inward to enter a socket 128, provided therefor in the chain sprocket 63.

The hand feed lever 118 is indicated in Figs. 2, 3 and 4 as slidable on shaft 119 to engage the clutch tooth 129 on the hub of said lever in a notch 130 in flange 131 on the shaft or conversely to disengage said tooth from the notch, to couple the lever with the shaft or on the other hand to uncouple it and enable it to hang downward in idle position, as shown in the broken lines Fig. 1.

For work which requires to be turned in respect to the cutter, a special fixture, such as illustrated particularly in Figs. 10 to 14 may be provided. This fixture is shown as a base 132 secured on the feed table and having a collet clutch 133 rotatably and slidably mounted therein substantially parallel with the axis of the cutter 134. By in and out or longitudinal movement of this chuck, the work indicated at 135 may be carried toward and away from the cutter and by rotation of said chuck different portions of the work may be carried toward or away from the cutter.

The rotary movement of the collet chuck is effected in the illustration by a sprocket gear 136, slidably keyed at 137 on the tubular spindle 138 of the chuck and the in and out feed movement of the chuck is effected by a cam roll 139 journalled on the fixture base engaging the box cam 140 removably keyed on the spindle at 141.

Drive of the sprocket 136 is effected through a sprocket chain 142 shown in Figs. 4, 10 and 11 as extending upwardly to said sprocket from a lower sprocket 143 on shaft 144 journalled in bracket 145 attached to the inner wall of the hollow base below the feed carriage. This lower sprocket shaft is shown as driven through bevel gearing 146 from a vertical shaft 147 carrying a sprocket 148 on its upper end connected by chain 149 with a sprocket 150 removably secured at 151 on the lower end of cam shaft 57.

A spring tensioned chain tightener is shown at 152 for keeping the upwardly extending sprocket chain 142 taut.

To effect a fine control of the cutting action a special feed cam is shown at 153 attached to or forming part of the upper sprocket 136 and engaged by a cam roll 154 on the upper end of lever 155 pivoted at 156 on a bracket 157 adjustably and removably fixed on the base at 158. For fine adjustments the roll carrying lever 155 is shown as engaged by a set screw 159. The combined sprocket 136 and feed cam 153 are shown in Fig. 12 as held in position at the side of bracket 132 by a dependent guard 160, which keeps the cam lined up with the companion roller 154, irrespective of sliding movements of the chuck spindle within the same. The chuck may be of conventional design adapted to be closed or opened by a projecting hand wheel 161 at the outer end of the chuck spindle.

A single lobe cam such as indicated at 50a may be employed when using the rotary fixture described, which cam as indicated in Fig. 14 will serve simply to bring the feed table up to the cutter, after which the special feed cam 153 on the chuck spindle, by engagement with the relatively stationary roll 154, will effect necessary feed movements of the table. In such rotation of the chuck spindle the cam 140 will effect the in and out movements required to project the work toward and to retract it from the cutter. Cams 140 of different shape for different kinds of work can be readily substituted and similarly different designs of cams 153 can be interchanged on the chuck spindle. The long reach of chain 142 extending up from the lower sprocket in the base of the machine allows for necessary carriage movement, the idler 152 automatically taking up any slack that may occur in such carriage movement. The gear ratio in the chain of drive connections from the main cam shaft 57 to the chuck spindle may be such as to complete one or more complete or fractional rotations of the chuck spindle for each rotation of the main cam, depending upon the character of operations to be effected.

After the cut is completed and the cam 140 has effected withdrawal of the work from the cutter, then the feed control may be automatically returned to the main cam, the single lobe of which will quickly shift back the feed carriage to bring the work back clear of the cutter where it can be readily removed from the chuck and be replaced by a fresh blank, the throwout clutch being operated in such retracted position of the carriage to enable such operations being performed.

What is claimed is:

1. A milling machine of the character disclosed, comprising in combination a cutter spindle, a cooperating work carrying table, a lever for reciprocating said table, a cam for actuating said lever, a shaft on which said cam is removably mounted, a worm gear on said shaft, a trip pin carried by said worm gear, a worm for driving said worm gear, a clutch for controlling operation of said worm, a clutch control lever, a releasable latch for holding said clutch control lever in clutch engaged relation, said latch having a portion positioned for engagement by said trip pin and drive means for said cutter spindle and said clutch controlled worm.

2. A milling machine of the character disclosed, comprising in combination a cutter spindle, a cooperating work carrying table, a lever for reciprocating said table, a cam for actuating said lever, a shaft on which said cam is removably mounted, a worm gear on said shaft, a trip pin carried by said worm gear, a worm for driving said worm gear, a clutch for controlling operation of said worm, a clutch control lever, a releasable latch for holding said clutch control lever in clutch engaged relation, said latch having a portion positioned for engagement by said trip pin, drive means for said cutter spindle and said clutch controlled worm and a hand control connected with the clutch control lever and having a cam for arbitrarily releasing said latch.

3. A milling machine of the character disclosed, comprising in combination a cutter spindle, a cooperating work carrying table, a lever for reciprocating said table, a cam for actuating said lever, a shaft on which said cam is removably mounted, a worm gear on said shaft, a trip pin carried by said worm gear, a worm for driving said worm gear, a clutch for controlling operation of said worm, a clutch control lever, a releasable latch for holding said clutch control lever in clutch engaged relation, said latch having a portion positioned for engagement by said trip pin, drive means for said cutter spindle and said clutch controlled worm, said removable cam having a lobe or lobes and there being one or a number of the trip pins, corresponding to the number of lobes of the cam.

4. An automatic milling machine, comprising in combination, a horizontal cutter spindle, a horizontally reciprocating milling table, a vertically disposed shaft, a lobed cam removably engaged on said vertical shaft, a lever engaging said cam and connected with said milling table, worm gearing for driving said cam shaft, clutch means for controlling operation of said vertical cam shaft and means carried by said vertical cam shaft for automatically controlling said clutch means.

5. An automatic milling machine, comprising in combination, a horizontal cutter spindle, a horizontally reciprocating milling table, a vertically disposed shaft, a lobed cam removably engaged on said vertical shaft, a lever engaging said cam and connected with said milling table, worm gearing for driving said cam shaft, clutch means for controlling operation of said vertical cam shaft, means carried by said vertical cam shaft for automatically controlling said clutch means and hand control means for arbitrarily engaging and disengaging the clutch means independently of the automatic control of the same.

6. An automatic milling machine, comprising in combination, a reciprocating milling table, a cam shaft, a lobed cam removably engageable in definitely located relation on said cam shaft, a cam arm engaged with said cam and connected with said milling table, a worm gear on the cam shaft, a worm for driving said worm gear, a clutch engageable and disengageable to start and stop said worm, a clutch lever for effecting engagement and disengagement of the clutch and biased in a clutch disengaging direction, a spring mounted latch lever for holding the clutch lever in the clutch engaged relation, a pin operated by the cam shaft to effect release of said latch lever from holding said clutch lever, a handle having a push pull connection with said clutch lever and latch releasing engagement with said latch lever and a spindle shaft in cooperative relation with said milling table.

7. In an automatic milling machine, a shiftable milling table, a drive shaft for the same, a lobed cam located on said drive shaft for controlling movements of said milling table, automatic trip means including a trip pin for each lobe of said cam, certain of said trip pins being foldable when out of service, a trip member engageable by the trip pin or pins in service for interrupting operation of the milling table and a cutter spindle in cooperative relation to said milling table.

8. In a machine of the character disclosed, a cutter spindle, a cooperating work carriage and drive means for said carriage including a drive shaft having cooperating clutch elements, a clutch lever biased in a clutch opening direction, a latch lever for holding said clutch lever in the clutch engaged relation, means for automatically releasing said latch lever at the end of a predetermined cycle of the machine and a handle rod connected with said clutch lever for arbitrarily effecting shifting of the same in opposite directions and engageable with said latch lever for arbitrarily releasing the same from holding engagement with the clutch lever.

9. In an automatic milling machine, a constantly running cutter spindle, a reciprocating work carriage in cooperative relation therewith, a cam shaft, a cam of one or more lobes on said cam shaft, a cam lever for controlling said reciprocating work carriage in accordance with the shape and lobe number of the cam on the cam shaft, means for driving said cam shaft, including a throw out clutch for stopping operation of the cam shaft, a trip or trips corresponding in number and relative position to the lobe or lobes of the cam on the cam shaft and means operable by said trip or trips for actuating said throwout clutch accordingly.

10. An automatic milling machine, comprising cooperatively related cutter spindle and reciprocating work carriage, a cam lever connected to drive said work carriage, a cam arranged to operate said cam lever and contoured to control definite movement of said work carriage, said cam and cam lever having closely related centers and the cam extending over said cam lever and said lever having a cam follower roll offset above the normal plane of the lever to engage the overlying portion of the cam.

11. An automatic milling machine, comprising in combination a horizontal cutter spindle, a horizontally reciprocating milling table, a rack connected with said table, a horizontally oscillating lever having a gear segment in engagement with said rack, a cam rotating on a vertical axis in engagement with said lever and contoured to effect desired table feed movements, a second rack connected with said table, a pinion in engagement with said second rack and a hand lever connected with said spindle for shifting the table independently of the cam feed.

12. A milling machine of the character disclosed, comprising in combination, a cutter spindle, a cooperating work carrying table, a lobed edge cam, a lever in engagement with said edge cam and connected with said table, a weight acting on said table to hold said lever in following engagement with said edge cam, a shaft on which said cam is removably mounted, a trip member carried by said shaft, gearing for operating said shaft including a clutch, a clutch control lever, a releasable latch for holding said clutch control lever in clutch engaged relation, said latch having a portion positioned for engagement by said trip member for automatically releasing the latch, drive means for said cutter spindle and said shaft drive gearing and means for arbitrarily controlling said clutch independently of said automatic operation.

13. A milling machine of the character disclosed, comprising in combination, a cutter spindle, a cooperating work carrying table, a lobed edge cam, a lever in engagement with said edge cam and connected with said table, a weight acting on said table to hold said lever in following engagement with said edge cam, a shaft on which said cam is removably mounted, a trip member carried by said shaft, gearing for operating said shaft including a clutch, a clutch control lever, a releasable latch for holding said clutch control lever in clutch engaged relation, said latch having a portion positioned for engagement by said trip member for automatically releasing the latch, drive means for said cutter spindle and said shaft drive gearing and means for shifting said table independently of said cam and weight operation, including a hand lever, a pinion geared to the table and a clutch by which said hand lever may be rendered operative or inoperative at will.

14. In a milling machine, the combination of cooperating cutter spindle and work carrying table, a lever connected with said table, an edge cam engaged by said lever and contoured to control desired movements of said table, a suspended weight connected with said table for effecting following engagement of said lever with said contoured edge cam and releasable means for supporting said suspended weight independently of its connection with the table to permit movements of said table uninfluenced by said weight.

15. In a milling machine, the combination of cutter spindle and sliding work table, a rack on said work table, a lever having a gear segment engaged with said rack, a cam roll carried by said lever, a cam engaged with said cam roll, a pivot stud for said lever and a rotatably adjustable bearing bushing in which said stud is eccentrically mounted and whereby the pivotal center of said lever may be accurately adjusted in respect to said table rack and said cam by angular adjustments of said bearing bushing.

16. A milling machine of the character disclosed, comprising in combination, a cutter spindle, a cooperating work carrying table, a lobed edge cam, a lever for engagement with said edge cam and connected with said table, a weight connected to hold said lever in following engagement with said edge cam, a shaft on which said cam is removably mounted, a trip member operated by said shaft in timed relation to said lobed cam, gearing for operating said shaft including a clutch, clutch release means automatically operable by said trip member at the end of a predetermined movement of said lobed cam and means for arbitrarily controlling said clutch independently of said automatic operation.

FREDERICK KOCH.